(12) United States Patent
Lou et al.

(10) Patent No.: US 6,374,163 B1
(45) Date of Patent: Apr. 16, 2002

(54) ONLINE FREQUENCY ANALYSIS FOR RESOURCE OPTIMIZED SYSTEMS

(75) Inventors: Yongle Lou, Shelby Township; Fritz Paul-Emil Dilger, Royal Oak; Jeffrey Thomas Musson, Waterford, all of MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 09/822,954

(22) Filed: Mar. 30, 2001

(51) Int. Cl.$^7$ .............................. G06F 7/00; G06F 17/00
(52) U.S. Cl. ........................................................ 701/1
(58) Field of Search .................... 701/1, 29; 324/76.24, 324/76.19

(56) References Cited

U.S. PATENT DOCUMENTS 5,736,923 A * 4/1998 Saab ........................... 340/429
5,991,692 A * 11/1999 Spencer, II et al. ......... 701/217

* cited by examiner

Primary Examiner—Yonel Beaulieu
(74) Attorney, Agent, or Firm—Brinks Hofer Gilson & Lione

(57) ABSTRACT

A method and system is provided for acquiring and analyzing vehicle motion signals to determine vehicle performance. The sampled vehicle motion signals are transferred from the time domain to the frequency domain using online frequency analysis. Once the frequency spectrum for the sampled vehicle motion data is obtained, the main frequencies and associated amplitudes are identified. Depending on the type of test conducted and the vehicle components to be analyzed, the natural frequencies of interest will be known and identified in the frequency spectrum. Online frequency analysis is used for analyzing the pre-defined frequencies in embedded systems with restricted computational resources and storage facilities. A weight filter matrix is used to calculate the frequency spectrum of interest in real time. The matrix is pre-calculated in accordance with a given sampling time, sampling rate, and selected frequencies.

15 Claims, 4 Drawing Sheets

ONLINE FREQUENCY ANALYSIS FOR RESOURCE OPTIMIZED SYSTEMS

FIELD OF THE INVENTION

The present invention relates to systems and methods for evaluating vehicle motion signals to improve a vehicle's performance.

BACKGROUND ART

Throughout the development of an automobile, testing is required to determine whether the vehicle is performing to design specification. For example, the performance of a vehicle's frame and suspension is tested over rough road conditions to ensure the vehicle can withstand the road conditions as well as provide a minimum level of comfort and safety for vehicle occupants.

Typically, sensors are disposed at various locations on the vehicle to measure the vehicle's motion. The sensor signals are then processed by an in-vehicle control and processing system. More specifically, the signals are transferred from the time domain to the frequency domain using the Fast Fourier Transform (FFT) method to obtain a frequency spectrum for the given vehicle motion signals. The frequency spectrum may then be analyzed to determine whether the vehicle is vibrating at its natural frequencies. If the amplitude of the vibration at the vehicle's natural frequencies is unacceptable for vehicle durability and occupant comfort and safety reasons, changes would then be made to the vehicle's frame/body and/or suspension.

While conventional methods and systems for evaluating a vehicle's performance by acquiring and analyzing vehicle motion signals using FFT to determine the frequency content of the signals achieved their intended purpose, many problems still exist. For example, current systems and methods require significant processing power and storage resources. Current methods (i.e. FFT) are impractical for use in production embedded systems, such as a production vehicle control and stability system. Thus, frequency analysis of vehicle motion signals has been limited to the testing and the development stages of a vehicle on pre-production vehicles.

Therefore, what is needed is a new and improved system and method for analyzing vehicle motion signals for subsequent use by a production vehicle embedded system, such as a production vehicle control and stability system. The new and improved system and method must be suitable for embedded systems having restricted computational resources and storage facilities.

SUMMARY OF THE INVENTION

In accordance with an aspect of the present invention, a method and system is provided for acquiring and analyzing vehicle motion signals to improve vehicle performance. The sampled vehicle motion signals are transferred from the time domain to the frequency domain using an online frequency analysis. Once the frequency spectrum for the sampled vehicle motion data is obtained, the frequencies of interest and associated amplitudes are identified. Depending on the type of test conducted and the vehicle components to be analyzed, the natural frequencies of interest will be known and identified in the frequency spectrum. For example, during a rough road test the natural frequencies of interest in a yaw rate signal for determining the performance of the frame/body and the vehicle suspension are 2 Hz and 10 Hz respectively. The present invention provides a weight filter matrix to calculate the frequency spectrum of interest in real time. The matrix is pre-calculated in accordance with the given sampling time, sampling rate, and frequencies of interest. More specifically, for rough road analysis, the frequencies of 2 Hz, 4 Hz, 6 Hz, 8 Hz, and 10 Hz in a yaw rate signal are most interesting. Thus, the present invention greatly reduces the number of computations needed to obtain a frequency spectrum as compared to prior art systems and methods that conduct the Fast Fourier Transform (FFT) to obtain all possible frequencies present in the vehicle motion signal. In real time, the vehicle motion signal is multiplied by a corresponding vector in the weight filter matrix to transfer the signal from the time domain to the frequency domain.

Further objects, features and advantages of the invention will become apparent from consideration of the following description and the appended claims when taken in connection with the accompanying drawings.

DETAILED DESCRIPTION OF THE INVENTION

Figure 1:
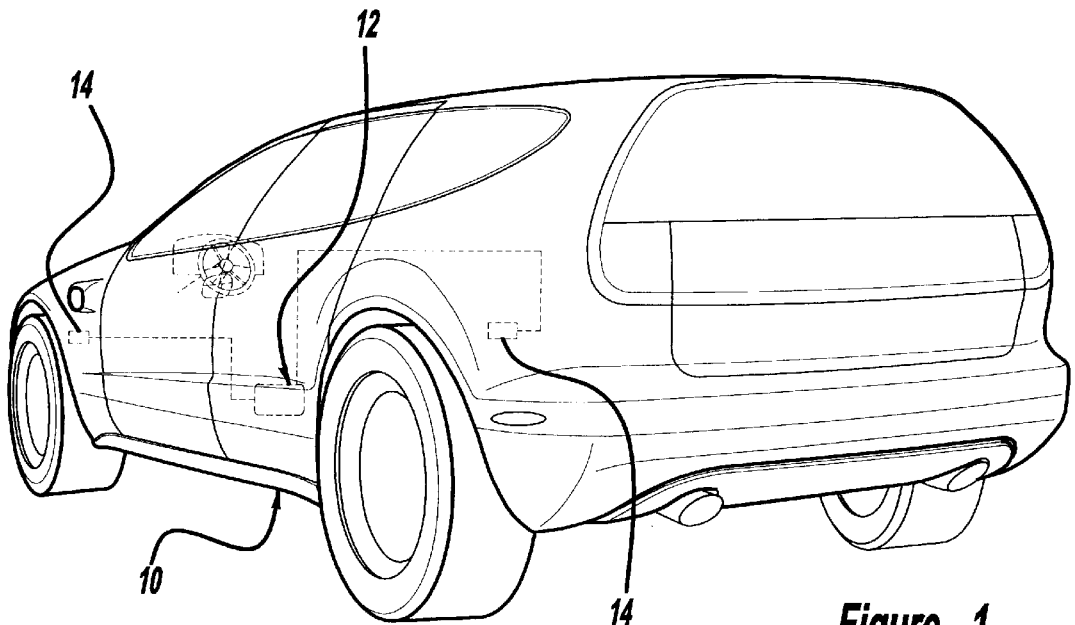
FIG. 1 is a perspective view of a vehicle equipped with the system of the present invention.

Referring now to FIG. 1, a vehicle 10 equipped with an embedded system 12 is illustrated, in accordance with the present invention. Embedded system 12 is in communication with a plurality of sensors 14 for acquiring vehicle motion signals.

Typically, embedded system 12 includes a microprocessor in communication with a storage medium such as read only memory (ROM), random access memory (RAM), non-volatile memory (NVM), or similar devices.

In operation, embedded system 12 samples the vehicle motion signals generated by sensors 14 for a predefined sampling time (T). System 12 acquires samples at a predefined sampling rate ($\Delta t$). The total number of sampled data (N) is defined by the equation $N=T/\Delta t$. The discrete sampled signal will be represented by the term $r(n\Delta t)$ where $n=0,1,\ldots,N-1$ and the amplitude and initial phase of vibration for a given frequency ($m\Delta f$) in HZ will be represented by the term $s(m\Delta f)$ where $0 \leq m < NT/2$, for the purposes of illustration in this disclosure.

In order to determine a vehicle's dynamic performance typically the Discrete Finite Fourier Transform (DFFT) of end points of a sampled signal, such as a body motion signal is conducted. Such the Discrete Finite Fourier Transform (DFFT) is presented below to provide a better understanding of the present invention. The transformation of body motion signals from the time domain to the frequency domain may be described by the following equations:

$$s(m\Delta f) = \frac{T}{N}\sum_{n=0}^{N-1} r(n\Delta t)e^{-j2\pi nm/N} \quad (2\text{-}1)$$

$$s(m\Delta f) = \frac{T}{N}\sum_{n=0}^{N-1} r(n\Delta t)\left[\cos\left(\frac{2\pi mn}{N}\right) - j\sin\left(\frac{2\pi mn}{N}\right)\right] \quad (2\text{-}2)$$

Or, $$s(m\Delta f) = \frac{T}{N}\sum_{n=0}^{N-1} r(n\Delta t)\cos\left(\frac{2\pi mn}{N}\right) - j\frac{T}{N}\sum_{n=0}^{N-1} r(n\Delta t)\sin\left(\frac{2\pi mn}{N}\right) \quad (2\text{-}3)$$

The amplitude may be defined by the following equation:

$$|s(m\Delta f)| = \frac{T}{N} \times \sqrt{\left(\sum_{n=0}^{N-1} r(n\Delta t)\cos\left(\frac{2\pi mn}{N}\right)\right)^2 + \left(\sum_{n=0}^{N-1} r(n\Delta t)\sin\left(\frac{2\pi mn}{N}\right)\right)^2} \quad (2\text{-}4)$$

However, since there are multiple items with the same frequency in the Fourier transform series, the real amplitude of a given frequency is calculated using the following equation:

$$A_{|s(m\Delta f)|} = \begin{cases} \frac{1}{T}|s(0)| & \text{if } m = 0 \\ \frac{2}{T}|s(m\Delta f)| & \text{if } m > 0 \end{cases} \quad (2\text{-}5)$$

Road surface character may be determined using the following equation:

$$E = \sum_{m=1}^{M} |s(m\Delta f)|^2 \quad (2\text{-}6)$$

Where E is known as the power spectrum that forces the vehicle motion or vibration at the detected frequencies. A major benefit to using equation 2-6 to detect road surface character is to avoid calling a square root function. Avoiding the use of the square root function eliminates the need for increased computational resources that are especially limited in embedded systems.

Equation 2-2 shown above may be calculated using the following matrix equation:

$$S_{M\times1} = W_{M\times N}R_{N\times1} \quad (3\text{-}1)$$

Where the frequency vector is described by the following equation:

$$S_{M\times1} = \{s(0)s(\Delta f) \ldots s((M-1)\Delta f)\}^T \quad (3\text{-}2)$$

$$\left(0 < = M < \frac{NT}{2}\right),$$

and the sampled signal vector is described by the equation:

$$R_{N\times1} = \{r(0)r(\Delta t) \ldots r((N-1)\Delta t)\}^T \quad (3\text{-}3)$$

and a weight filter matrix is described by the following equation:

$$W = \frac{T}{N}\begin{bmatrix} w_{00} & w_{01} & \ldots & w_{0N-1} \\ w_{10} & w_{11} & \ldots & w_{1N-1} \\ \ldots & \ldots & \ldots & \ldots \\ w_{M-11} & w_{M-12} & \ldots & w_{M-1N-1} \end{bmatrix}_{M\times N} \quad (3\text{-}4)$$

Where, $$w_{mn} = \cos\left(\frac{2\pi m}{N}n\right) - j\sin\left(\frac{2\pi m}{N}n\right) \quad (3\text{-}5)$$

$$m = 0, 1, 2, \ldots, M-1$$

$$n = 0, 1, 2, \ldots, N-1$$

In a preferred embodiment of the present invention, a method is provided for reducing the calculation time and the computational recourses required to compute matrix equation 3-3. The method is especially suitable for use in embedded systems. This is accomplished first by rewriting the sampled signal vector as follows:

$$R_{N\times1} = R_{N\times1}^0 + R_{N\times1}^1 + \ldots + R_{N\times1}^n + \ldots + R_{N\times1}^{N-1}$$

$$R_{N\times1}^n = \{0\ 0\ \ldots\ r(n\Delta t)\ \ldots\ 0\}^T$$

$$n=0, 1, 2, \ldots, N-1 \quad (4\text{-}1)$$

Thus equation 3-1 becomes $$S_{M\times1} = \sum_{n=0}^{N-1} W_{M\times N}R_{N\times1}^n \ (n = 0, 1, 2, \ldots, N-1) \quad (4\text{-}2)$$

Equation (4-2) provides an improved method for identifying the existence and amplitude of frequencies of interest in the sampled signals. This equation indicates that the frequency spectrum $S_{M\times1}$ can be calculated by the linear summation of $W_{M\times N}R_{N\times1}^n$ (n=0, 1, 2, . . . , N-1) where the sampled signal vector $R_{N\times1}^n$ represents the n-th sampled signal r(n$\Delta$t) (n=0,1, . . . , N-1) and $W_{M\times N}$ is the pre-calculated constant Weight Filter Matrix. The term $W_{M\times N}R_{N\times1}^n$ is the contribution of the n-th sampled signal r(n$\Delta$t) to the frequency spectrum. In embedded systems a continuous signal stream must be processed at the same rate as the system receives a raw signal (a sample interval), the system does not allow access to out-of-time signals. This is why the system cannot afford even a modest-sized FFT calculation (with a number of floating operations per data point) to analyze the frequency spectrum. In equation (4-2) a task of calculating the frequency spectrum is divided into N sub-tasks $W_{M\times N}R_{N\times1}^n$ (n=0, 1, 2, . . . , N-1) that is performed in the sample interval and only depends on the current input signal. In embedded systems this calculation is completed in the step machine loop. After the N-th sampled signal is received, the frequency spectrum is completely built. Equation 4-2 provides online frequency analysis in embedded systems.

The present invention avoids the resource costly cosine and sin calculation of equation 3-4 by pre-calculating and storing in memory the matrix W of equation 3-5. Each element $W_{mn}$ of matrix W may be pre-calculated using predefined parameters that include sampling number N, sampling time T and frequency range M.

Figure 2:
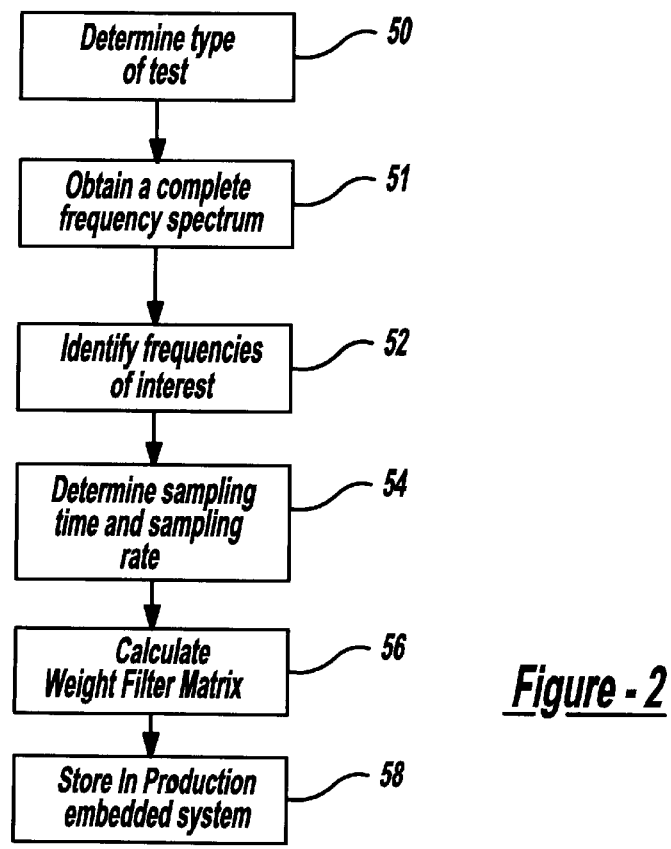
FIG. 2 is a flow diagram illustrating a method for analyzing vehicle motion signals, in accordance with the present invention.

Reference is now made to FIG. 2, which illustrates the method of the present invention for analyzing vehicle motion signals by pre-calculating the Weight Filter Matrix described above. The process begins at block 50 wherein the type of test to be performed is determined. Typical vehicle tests include, but are not limited to, vehicle durability testing, such as rough road testing. At block 51, a complete frequency spectrum analysis is performed using conventional methods, such as FFT or the like. The frequencies that are of specific interest are determined from this analysis, as represented at block 52. At block 54, the sampling time and sampling rates are identified. Finally, the Weight Filter Matrix as described above is calculated, as represented by block 56.

Once the Weight Filter Matrix has been determined for a particular test or vehicle operating condition, the matrix is stored in the memory facilities of a production vehicle embedded system, such as a vehicle control and stability system as represented by block 58. The matrix is now available to perform an online frequency analysis where sampled vehicle motion signals are transferred from the time domain to the frequency domain. This transformation occurs in real time and does not require an intermediate step of storing the sampled vehicle motion data.

Figure 3:
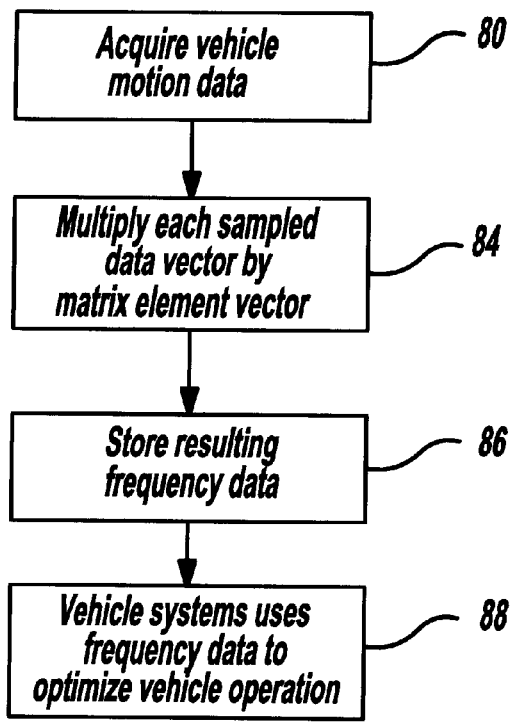
FIG. 3 is a flow diagram illustrating a method for testing a vehicle and analyzing vehicle motion signals using a limited frequency spectrum, in accordance with the present invention.

Referring now to FIG. 3, the method for conducting online frequency analysis using the Weight Filter Matrix to transfer an acquired vehicle motion signal from the time domain to the frequency domain is illustrated, in accordance with the present invention. At block 80, an embedded system, such as system 12 described above having the Weight Filter Matrix stored therein starts sending a vehicle motion signal. This vehicle motion signal may be a yaw rate signal generated by a yaw rate sensor or any other vehicle motion signal. Each acquired data sample vector is multiplied by a corresponding row vector of the matrix, as shown above, to arrive at a corresponding frequency component, as represented by block 84. Finally, the resulting frequency data may be stored in the memory facilities of system 12 for use by other vehicle systems such as a vehicle braking system, a vehicle traction control system, a vehicle stability system, etc., as represented by block 86. For example, at block 88 a vehicle system can use the frequency data generated using the Weight Filter Matrix to modify or optimize the operation of that system.

Figure 4:
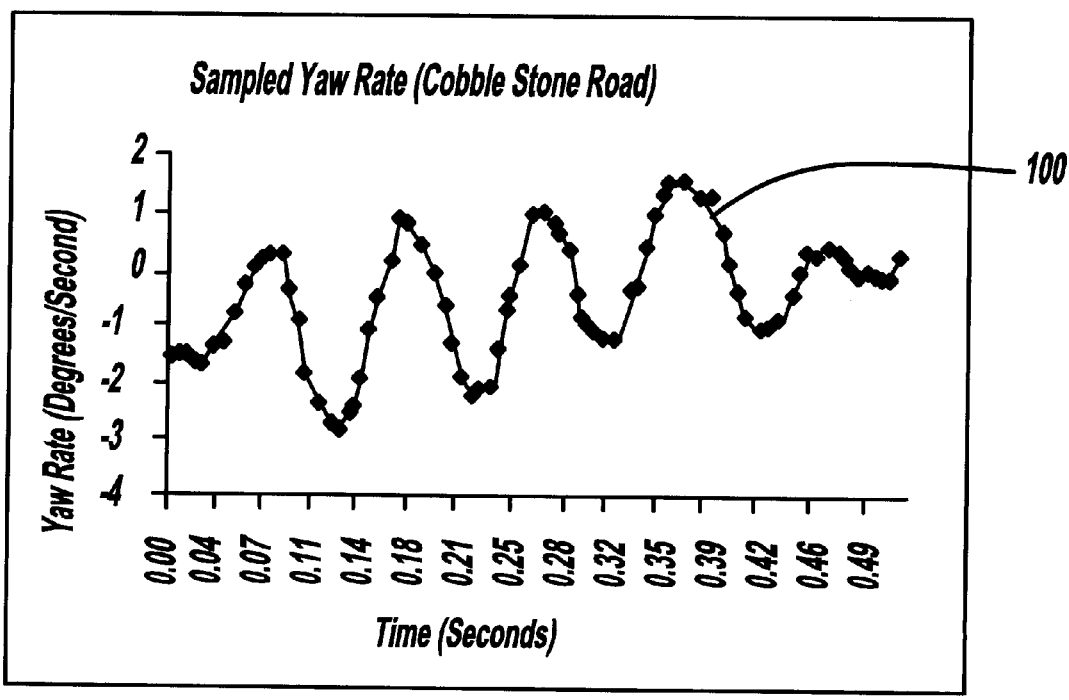
FIG. 4 is a graph depicting a vehicle yaw rate signal acquired by a yaw rate sensor during a cobble stone road test, in accordance with the present invention.

FIG. 4 is a graph depicting a vehicle yaw rate signal 100 acquired from a yaw rate sensor over a period of time, in accordance with the present invention. Yaw rate signal 100 was generated by driving a vehicle over a cobble stone road. As illustrated yaw rate signal 100 includes many frequency components. In order to analyze the impact of these frequency components on a vehicle's life, the comfort of a vehicle occupant and the stability of a vehicle the yaw rate signal must be converted from the time domain to the frequency domain. The amplitude of each of the frequency components of interest may then be determined.

Figure 5:
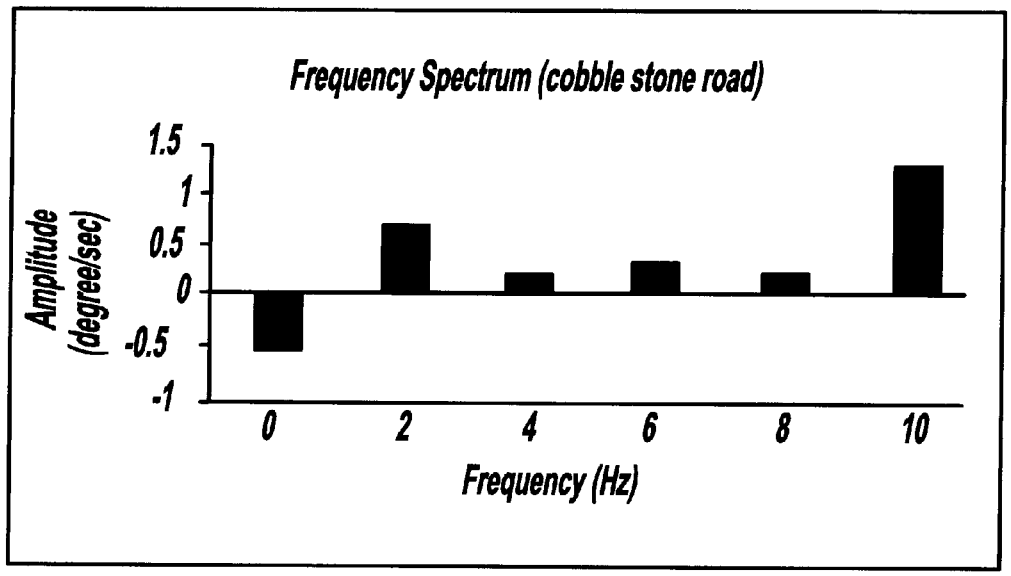
FIG. 5 is a frequency spectrum of a yaw rate signal acquired by a yaw rate sensor during a cobble stone road test, in accordance with the present invention.

A frequency spectrum of yaw rate signal 100 determined using the Weight Filter Matrix, is illustrated in FIG. 5. The amplitudes of the frequencies may E now be analyzed and compared to acceptable limits. As illustrated the frequency component with the highest amplitude is 10 Hz. Since the natural frequency of the vehicle's suspension is known to occur at 10 Hz, the performance of the vehicle's suspension may be determined and for example, a vehicle stability control system can use this frequency data to optimize performance of the system. The method of the present invention calculates only frequencies of interest, thus significant reductions in computational time and computational resources are realized.

Figure 6:
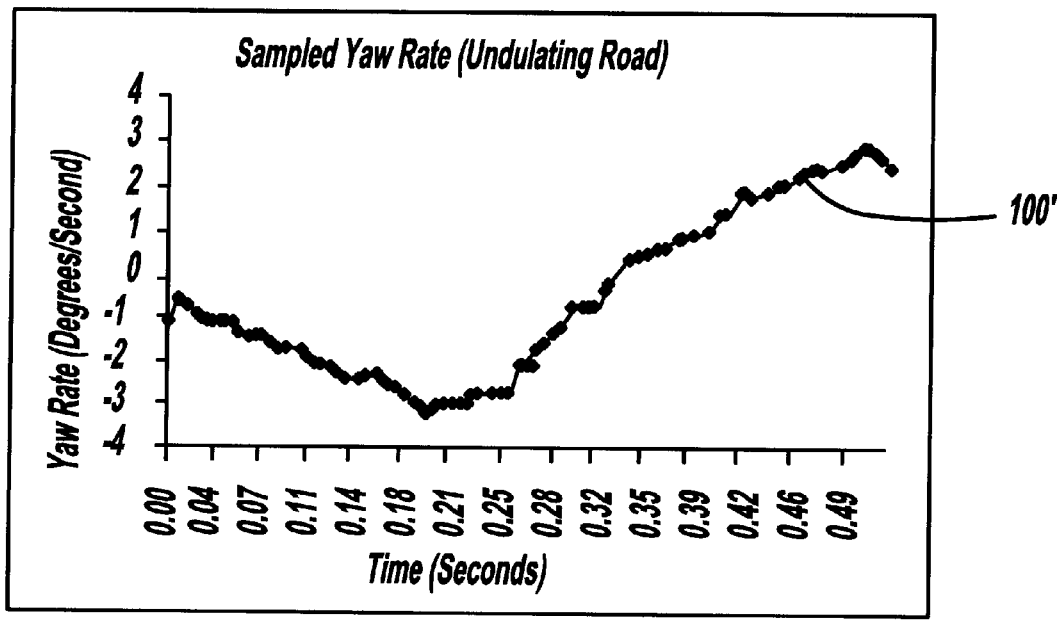
FIG. 6 is a graph depicting a vehicle yaw rate signal acquired by a yaw rate sensor during an undulating road test, in accordance with the present invention.
Figure 7:
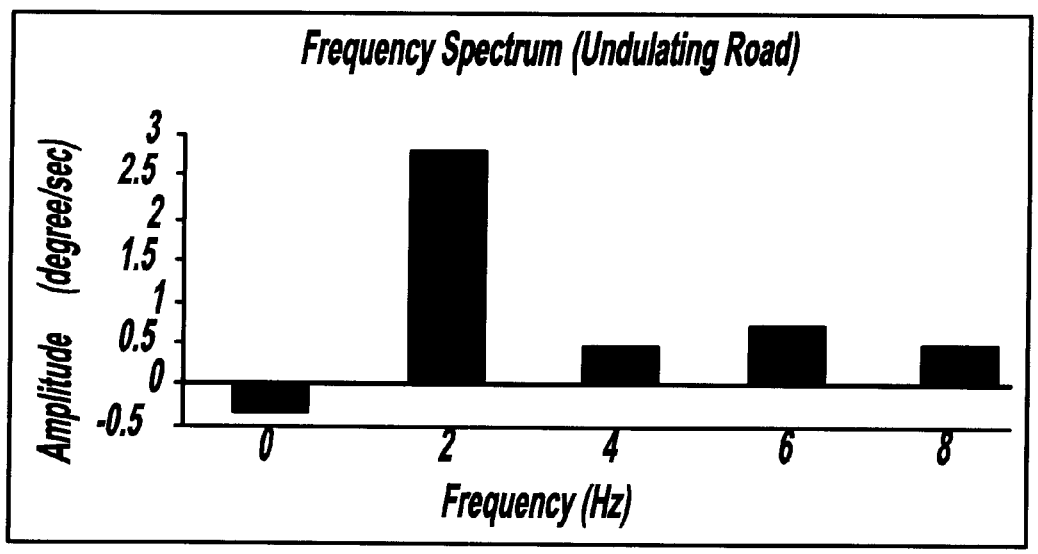
FIG. 7 is a frequency spectrum of a yaw rate signal acquired by a yaw rate sensor during an undulating road test, in accordance with the present invention.

FIG. 6 is a graph depicting a vehicle yaw rate signal 100' acquired from a yaw rate sensor over a period of time, in accordance with the present invention. In this instance, yaw rate signal 100' was generated by driving a vehicle over an undulating road. Similarly, as seen above with respect to yaw rate signal 100, yaw rate signal 100' includes many frequency components. However, yaw rate signal 100' has a significantly larger frequency component at 2 Hz. This of course is of critical importance to discover, as the amplitude at this frequency may have a significant impact on a vehicle's life, stability and the comfort of a vehicle occupant. A frequency spectrum, including the frequencies of interest, of yaw rate signal 100' is illustrated in FIG. 7. As shown the amplitudes of all of the frequencies except the 2 Hz component are relatively low. The 2 Hz component is known to be the natural frequency of the vehicle's body or frame. Since the natural frequency of the vehicle's body or frame is known to occur at 10 Hz, the performance of the vehicle's body or frame may be determined. Only frequencies of interest have been calculated, thus significant reductions in computational time and computational resources are realized through the use of the present invention.

Therefore, the present invention has many advantages and benefits over prior art systems and methods. For example, the present invention provides a method for determining the existence and amplitude of certain frequencies of interest in a vehicle motion signal. The vehicle motion signals may be acquired by an embedded vehicle system, such as a vehicle stability control system. The acquired signals are transferred from the time domain to the frequency domain in real time. The final frequency and amplitude data may be used to modify or optimize the operation of the various vehicle control systems. For example, if the amplitude of a particular frequency of interest exceeds a predefined threshold stored in the memory of an embedded system, the system may decide to operate in a different state or mode.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A method for determining a frequency content of a vehicle motion signal for a vehicle, the method comprising:

sampling a vehicle motion signal;

transferring the sampled vehicle motion signal from a time domain to a frequency domain to obtain a complete frequency spectrum;

identifying at least one frequency of interest in the complete frequency spectrum;

calculating a weight filter matrix for the at least one frequency of interest;

storing the weight filter matrix in an embedded vehicle control system;

sampling the vehicle motion signal using the embedded vehicle control system; and determining an amplitude of the at least one frequency of interest present in the sampled vehicle motion signal sampled by the embedded vehicle control system, wherein the embedded vehicle control system uses the amplitude of the at least one frequency of interest to control the vehicle's performance.

2. The method of claim 1 further comprising determining a sampling time to acquire the motion signal.

3. The method of claim 1 further comprising determining a sampling rate at which to acquire the motion signal.

4. The method of claim 1 wherein the at least one frequency of interest is identified by performing a Fast Fourier Transform on the vehicle motion signal.

5. The method of claim 1 wherein the weight filter matrix is defined by:

$$W = \frac{T}{N} \begin{bmatrix} w_{00} & w_{01} & \cdots & w_{0N-1} \\ w_{10} & w_{11} & \cdots & w_{1N-1} \\ \cdots & \cdots & \cdots & \cdots \\ w_{M-11} & w_{M-12} & \cdots & w_{M-1N-1} \end{bmatrix}_{M \times N}$$

where, $$w_{mn} = \cos\left(\frac{2\pi m}{N}n\right) - j\sin\left(\frac{2\pi m}{N}n\right)$$

m=0, 1, 2, . . . , M −1 n=0, 1, 2, . . . , N −1

6. The method of claim 5 wherein the at least one frequency of interest is determined using equation:

$$S_{M \times 1} = \sum_{n=0}^{N-1} W_{M \times N} R_{N \times 1}^{n}$$

where, $R_{N \times 1}{}^n = \{0\ 0\ \ldots\ r(n\Delta t)\ \ldots\ 0\}^T$ n=0, 1, 2, . . . , N−1.

7. A method for determining a frequency content of a vehicle motion signal, the method comprising:

sampling a vehicle motion signal using an embedded vehicle control system;

determining an amplitude of at least one frequency of interest present in the vehicle motion signal using a weight filter matrix; and controlling the embedded vehicle control system's operation using the amplitude of the at least one frequency of interest.

8. The method of claim 7 further comprising determining a sampling time to acquire the motion signal.

9. The method of claim 7 further comprising determining a sampling rate at which to acquire the motion signal.

10. The method of claim 7 wherein the at least one frequency of interest is identified by performing a Fast Fourier Transform on the vehicle motion signal.

11. The method of claim 7 wherein the weight filter matrix is defined by:

$$W = \frac{T}{N} \begin{bmatrix} w_{00} & w_{01} & \cdots & w_{0N-1} \\ w_{10} & w_{11} & \cdots & w_{1N-1} \\ \cdots & \cdots & \cdots & \cdots \\ w_{M-11} & w_{M-12} & \cdots & w_{M-1N-1} \end{bmatrix}_{M \times N}$$

where, $$w_{mn} = \cos\left(\frac{2\pi m}{N}n\right) - j\sin\left(\frac{2\pi m}{N}n\right)$$

m=0, 1, 2, . . . , M−1 n=0, 1, 2, . . . , N−1.

12. The method of claim 11 wherein the at least one frequency of interest is determined using equation:

$$S_{M \times 1} = \sum_{n=0}^{N-1} W_{M \times N} R_{N \times 1}^{n}$$

where, $R_{N \times 1}{}^n = \{0\ 0\ \ldots\ r(n\Delta t)\ \ldots\ 0\}^T$ n=0, 1, 2, . . . , N−1.

13. A system for determining a frequency content of a vehicle motion signal, the system comprising:

an embedded vehicle control system for sampling a vehicle motion signal; and a weight filter matrix stored in a memory of the embedded vehicle control system for determining an amplitude of at least one frequency of interest present in the vehicle motion signal, and wherein the embedded vehicle control system uses the amplitude of the at least one frequency of interest to control the vehicle control system's operation.

14. The system of claim 13 wherein the weight filter matrix is defined by:

$$W = \frac{T}{N} \begin{bmatrix} w_{00} & w_{01} & \cdots & w_{0N-1} \\ w_{10} & w_{11} & \cdots & w_{1N-1} \\ \cdots & \cdots & \cdots & \cdots \\ w_{M-11} & w_{M-12} & \cdots & w_{M-1N-1} \end{bmatrix}_{M \times N}$$

where, $$w_{mn} = \cos\left(\frac{2\pi m}{N}n\right) - j\sin\left(\frac{2\pi m}{N}n\right)$$

m=0, 1, 2, . . . , M−1 n=0, 1, 2, . . . , N−1.

15. The system of claim 11 wherein the at least one frequency of interest is determined using equation:

$$S_{M \times 1} = \sum_{n=0}^{N-1} W_{M \times N} R_{N \times 1}^{n}$$

where, $R_{N \times 1}{}^n = \{0\ 0\ \ldots\ r(n\Delta t)\ \ldots\ 0\}^T$ n=0, 1, 2, . . . , N−1.

* * * * *